(12) United States Patent
Lee

(10) Patent No.: US 7,846,607 B2
(45) Date of Patent: Dec. 7, 2010

(54) SEPARATOR FOR FUEL CELL HAVING CHANNELS FOR SELF-HUMIDIFICATION

(75) Inventor: Dong Hun Lee, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 11/647,452

(22) Filed: Dec. 27, 2006

(65) Prior Publication Data

US 2008/0102348 A1    May 1, 2008

(30) Foreign Application Priority Data

Nov. 1, 2006    (KR) .................. 10-2006-0107476

(51) Int. Cl.
  *H01M 8/02* (2006.01)
  *H01M 8/04* (2006.01)
(52) U.S. Cl. .................. 429/456; 429/457; 429/518
(58) Field of Classification Search .................. 429/209; 29/623.1
See application file for complete search history.

(56) References Cited

U.S. PATENT DOCUMENTS

| 6,348,280 B1 | 2/2002 | Maeda et al. |
| 2003/0049514 A1 | 3/2003 | Mallant |

FOREIGN PATENT DOCUMENTS

| JP | 10-032011 | * | 2/1998 |
| JP | 2001-126746 | * | 5/2001 |
| JP | 2003-024998 | | 10/2003 |
| JP | 2004-055220 | * | 2/2004 |
| JP | 2004-165043 | * | 6/2004 |
| JP | 2005-190774 | | 7/2005 |
| KR | 1020030042640 | | 6/2003 |
| KR | 102006007514 | | 1/2006 |
| WO | WO 2004/075326 | | 9/2004 |
| WO | WO 2004/075326 A1 | * | 9/2004 |

* cited by examiner

*Primary Examiner*—Dah-Wei Yuan
*Assistant Examiner*—Angela J. Martin
(74) *Attorney, Agent, or Firm*—Morgan, Lewis & Bockius LLP

(57) ABSTRACT

A separator for a fuel cell includes a main separator and a sub separator. A plurality of intake manifolds and exhaust manifolds are perforated on both end portions of the main separator and the sub separator. A plurality of channels are formed on an upper surface of the main separator so that fuel is supplied through the different intake manifolds and is exhausted through the different exhaust manifolds. Auxiliary channels are formed on a lower surface of the main separator and an upper surface and a lower surface of the sub separator so as to connect the intake manifolds and the exhaust manifolds to the channels. A connecting channel is formed on a lower surface of the main separator so as to communicate with the channels, and connect the channels and the auxiliary channels.

7 Claims, 6 Drawing Sheets

SEPARATOR FOR FUEL CELL HAVING CHANNELS FOR SELF-HUMIDIFICATION

CROSS-REFERENCE TO RELATED APPLICATION

This application claims priority to and the benefit of Korean Patent Application No. 10-2006-0107476 filed in the Korean Intellectual Property Office on Nov. 1, 2006, the entire contents of which are incorporated herein by reference.

BACKGROUND OF THE INVENTION (a) Field of the Invention

The present invention relates to a separator for a fuel cell having channels for self-humidification, and, more particularly, to a separator for a fuel cell having channels for self-humidification in which a plurality of cathode intake/exhaust manifolds and anode intake/exhaust manifolds are formed such that directions of fuel flow in neighboring channels are opposite to one another and humidity is transferred from the side containing more humidity to the side containing smaller humidity through a GDL, thereby performing self-humidification without a separate humidifying apparatus.

(b) Description of the Related Art

Since transmittance of hydrogen ions is deteriorated if humidity is insufficient in a fuel cell stack, gas is supplied to the fuel cell stack in a state of being humidified. In a polymer electrolyte fuel cell, which uses a polymer electrolyte membrane, if humidity is deficient, transmittance of hydrogen is deteriorated. In addition, contact resistance between electrodes and a polymer electrolyte membrane is increased by contraction of an electrolyte membrane.

On the contrary, if there is too much humidity, a flooding phenomenon wherein moisture is condensed on the electrodes may occur, thereby preventing reaction gas from being diffused so as to deteriorate performance of a fuel cell.

In order to solve these problems, a humidifier is sometimes installed in an inlet of a fuel cell stack so as to regulate humidity at an inlet, and at the same time, there was an attempt of improving a shape of a separator so as to smoothly exhaust water generated in the stack. However, if a separate humidifier is installed, size of a fuel cell system is increased, and there may be pressure loss in the humidifier.

Accordingly, among other things, a method for humidifying a fuel cell stack without using a separate humidifier and for solving a flooding phenomenon is needed.

SUMMARY OF THE INVENTION

Embodiments of the present invention provide a separator for a fuel cell having channels for self-humidification without using a separate humidifier and for solving a flooding phenomenon wherein cathode and anode channels are blocked by condensed water.

An exemplary embodiment of the present invention provides a separator for a fuel cell having channels for self-humidification which is coupled to a membrane-electrode assembly so as to become passages of fuel and coolant and to support the membrane-electrode assembly including: a main separator and a sub separator; a plurality of intake manifolds and exhaust manifolds which are perforated on both end portions of the main separator and the sub separator and through which fuel inflows and is exhausted; a plurality of channels which are formed on an upper surface of the main separator so that fuel is supplied through the different intake manifolds and is exhausted through the different exhaust manifolds such that directions of fuel flow become opposite to one another; auxiliary channels which are formed on a lower surface of the main separator and an upper surface and a lower surface of the sub separator so as to connect the intake manifolds and the exhaust manifolds to the channels; and a connecting channel which is formed on a lower surface of the main separator at positions corresponding to the auxiliary channels so as to be communicated with the channels, and connecting the channels and the auxiliary channels such that the channels and the auxiliary channels communicate with one another.

The channels may be formed in a zigzag shape while the channels do not overlap with one another and are formed on an upper surface of the main separator such that directions of fuel flows in the neighboring channels are opposite to one another.

Another exemplary embodiment of the present invention provides a separator for a fuel cell having channels for self-humidification which is coupled to a membrane-electrode assembly so as to become passages of fuel and coolant and to support the membrane-electrode assembly including: a plurality of intake manifolds and exhaust manifolds which are perforated on both end portions and through which fuel inflows and is exhausted; a plurality of channels which are formed on an upper surface so that fuel is supplied through the different intake manifolds and is exhausted through the different exhaust manifolds such that directions of fuel flow become opposite to one another; a connecting channel which is formed on the upper surface so as to connect a pair of the intake manifold and the exhaust manifold among the plurality of the intake manifolds and the exhaust manifolds and the channels; and an auxiliary channel which is formed on a lower surface so as to connect a remained pair of the intake manifold and the exhaust manifold among the plurality of the intake manifolds and the exhaust manifolds and the channels.

The separator may further include an auxiliary passage which is formed on the lower surface so as to communicate the connecting channel with the channels.

The may be formed in a zigzag shape while the channels do not overlap with one another and are formed on the upper surface such that directions of fuel flows in the neighboring channels are opposite to one another.

DETAILED DESCRIPTION OF THE EMBODIMENTS

Figure 1:
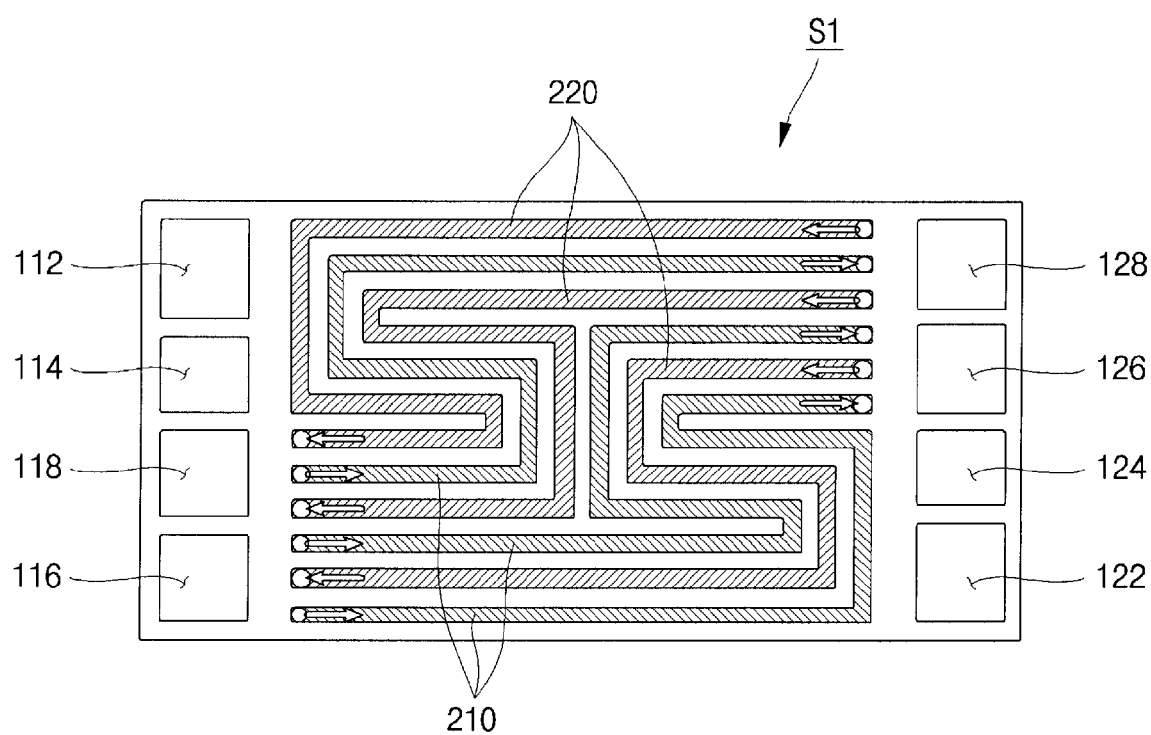
FIG. 1 is a top plan view showing flow of fuel in channels of a separator according to a first exemplary embodiment of the present invention.
Figure 2A:
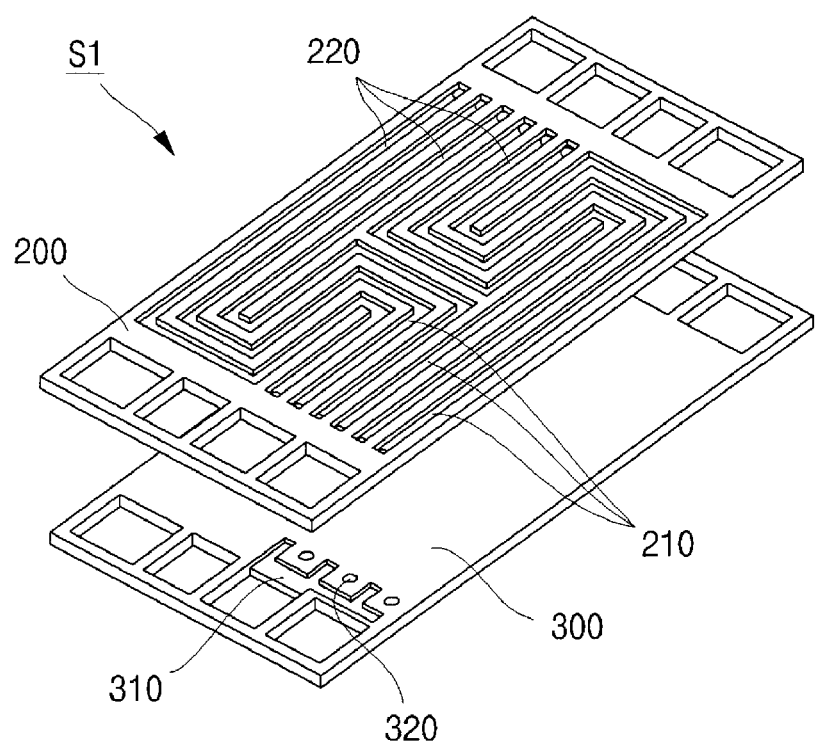
FIG. 2A is an exploded perspective view of a separator according to a first exemplary embodiment of the present invention.
Figure 2B:
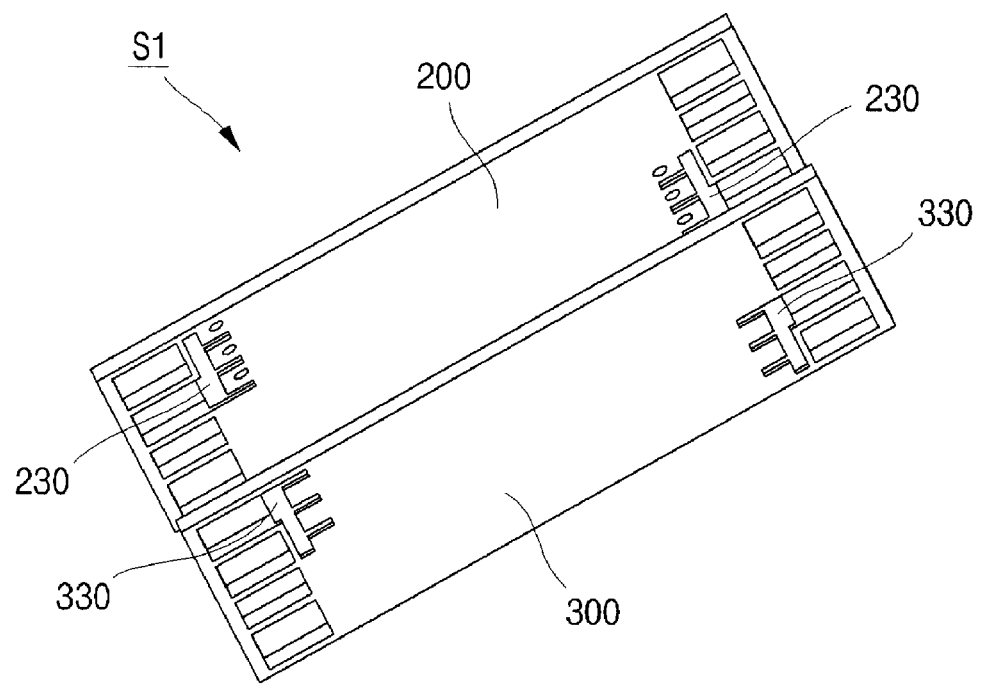
FIG. 2B is a bottom plan view of a separator of FIG. 2A.
Figure 3:
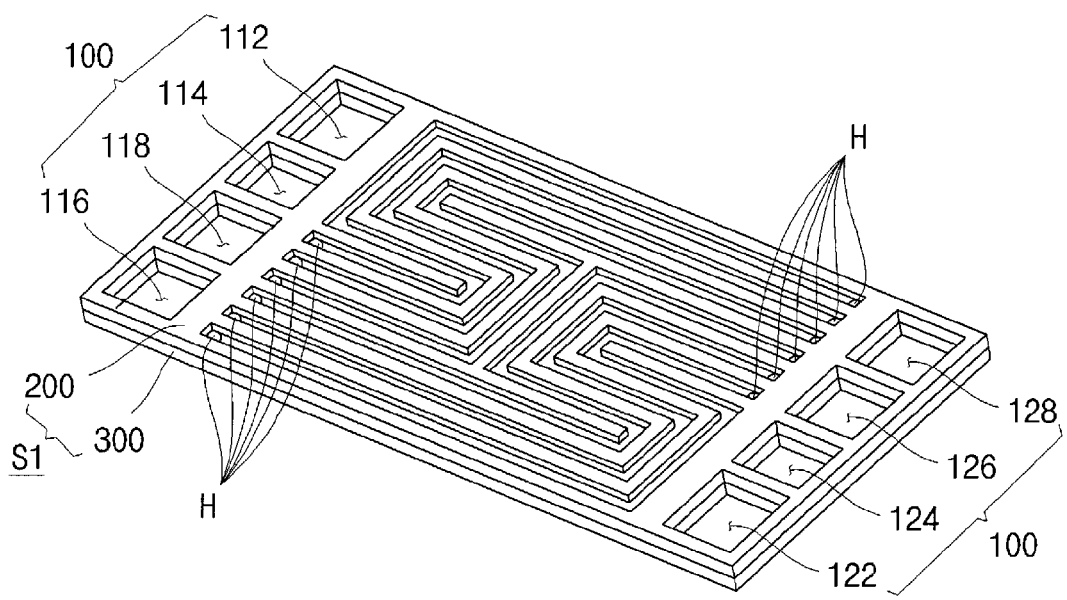
FIG. 3 is an assembled perspective of a separator of FIG. 2A.
Figure 4:
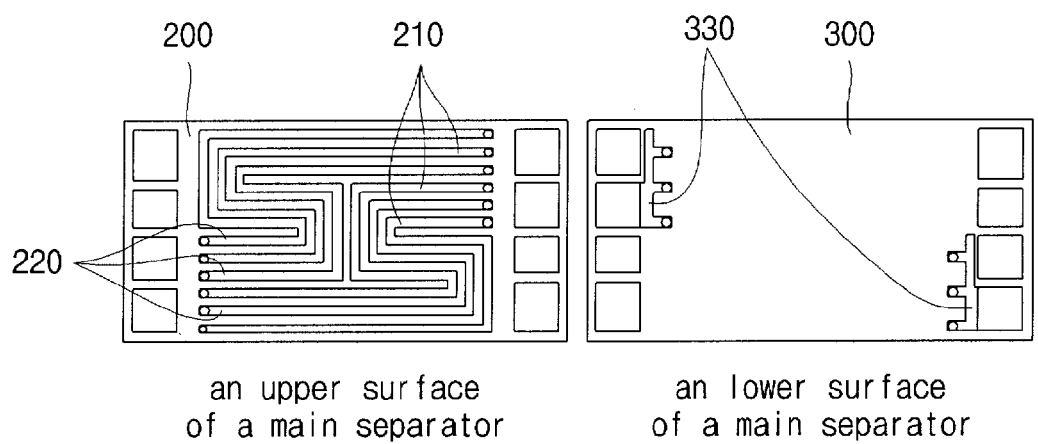
FIG. 4 are plan views showing a lower surface of a main separator and a lower surface of a sub separator according to a first exemplary embodiment of the present invention.

Exemplary embodiments of the present invention will hereinafter be described in detail with reference to the accompanying drawings.

Firstly, a separator having channels for self-humidification according to a first exemplary embodiment of the present invention will be explained. As shown in FIG. 1 to FIG. 4, a separator S1 according to a first exemplary embodiment of the present invention is coupled to a membrane-electrode assembly which is formed by coupling a gas diffusion layer (GDL) to a polymer electrolyte layer, anode, and cathode so as to support the membrane-electrode assembly, and make fuel evenly be diffused. Channels 210 and 220 for humidifying the membrane-electrode assembly within a fuel cell stack without a separate humidifying apparatus are formed in the separator S1.

The separator S1 according to a first exemplary embodiment of the present invention includes a main separator 200 and a sub separator 300 which is coupled to a lower side of the main separator 200. A plurality of manifolds 100, the channels 210 and 220, and connecting channels 230 are formed on the main separator 200 and the sub separator 300, and auxiliary channels 310 and 330 are formed on the sub separator 300.

The manifold 100s are perforated at both end portions along a length direction of the separator S1. An anode intake manifold 112 and a coolant intake manifold 114, a cathode exhaust manifold 118, and a cathode exhaust manifold 116 are formed at one end of the separator S1, and a cathode intake manifold 128, a cathode exhaust manifold 126, a coolant exhaust manifold 124, and an anode exhaust manifold 122 are formed at the other end of the separator S1 as shown in FIG. 1 (hereinafter, the cathode intake manifold is referred to as a first intake manifold, the cathode exhaust manifold is referred to as a first exhaust manifold, the cathode intake manifold is referred to as a second intake manifold, and the cathode exhaust manifold is referred to a second exhaust manifold).

Fuel which is supplied through the respective intake manifolds 116 and 128 is supplied in a state of low humidity since there is no separate humidifying apparatus, and fuel which is exhausted through the respective exhaust manifolds 118 and 126 is in a state of high humidity since it contains water which is generated by reaction of a fuel cell. The channels 210 and 220, the connecting channels 230, and the auxiliary channels 310 and 330 are formed such that humidity can be transferred from fuel in a state of high humidity to fuel in a state of low humidity.

A plurality of channels (hereinafter referred to as a first channel) 210 which serve as passages though which fuel flows from the first intake manifold 116 to the first exhaust manifold 126 are formed on an upper surface of the main separator 200, and a plurality of channels (hereinafter referred to as a second channel) 220 which serve as passages through which fuel flows from the second intake manifold 128 to the second exhaust manifold 118.

The first channel 210 and the second channel 220 are formed in a zigzag line, and are formed such that directions of fuel flow in neighboring passages become opposite to one another. The first channel 210 and the second channel 220 are connected to the manifold 100 by the connecting channel 230 and the auxiliary channels 310 and 330 which are formed on a lower surface of the main separator 200 and an upper surface and a lower surface of the sub separator 300, respectively.

The connecting channel 230 is formed on a lower surface of the main separator 200, and connects the first intake manifold 116 and the first exhaust manifold 126 to both ends of the first channel 210. For this, holes H which communicate with the connecting channel 230 are perforated at both ends of the first channel 210.

The auxiliary channels 310 and 330 are respectively formed at an upper surface and a lower surface of the sub separator 300. The upper surface auxiliary channel 310 which is formed on an upper surface of the sub separator 300 is formed in a shape identical to a shape of the connecting channel 230 which is formed on a lower surface of the main separator 200 so as to connect the first intake manifold 116 and the first exhaust manifold 126 to the first channel 210.

The lower surface auxiliary channel 330 which is formed on a lower surface of the sub separator 300 connects the second intake manifold 128 and the second exhaust manifold 118 to both ends of the second channel 220. For this, holes H which communicate with the lower surface auxiliary channel 330 are formed at both ends of the second channel 220, and a communicating hole 320 which communicates with the hole H is perforated on an upper surface of the sub separator 300.

By these structures, directions of fuel flow in the first channel 210 and the second channel 220 become different from one another. In addition, the exhaust manifolds 118 and 126 through which fuel containing much humidity is exhausted are dispersed on both sides of the separator S1, and humidity moves from the side containing much humidity to the side containing small humidity, so that a membrane-electrode assembly can be humidified without a separate humidifying apparatus.

Since moisture is evenly diffused during this process, a flooding phenomenon which is caused by excessive condensation of moistures at an end portion of a channel at a cathode side can be prevented.

Figure 5:
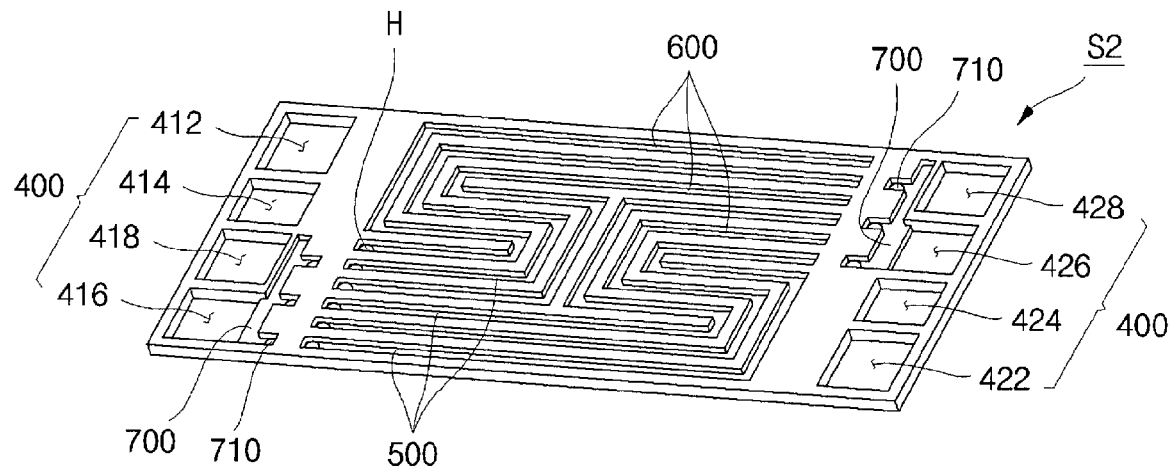
FIG. 5 is a perspective view of a separator according to a second exemplary embodiment of the present invention.
Figure 6:
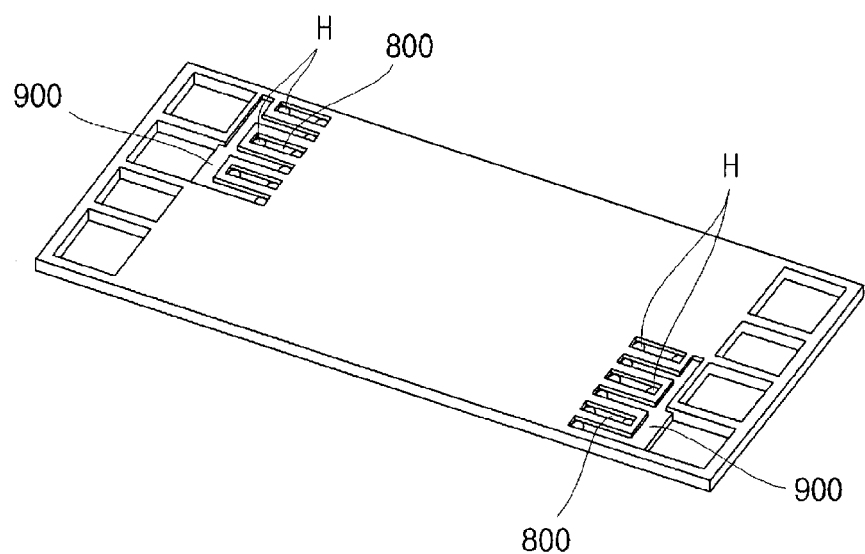
FIG. 6 is a bottom plan view of a separator of FIG. 5.
Figure 7:
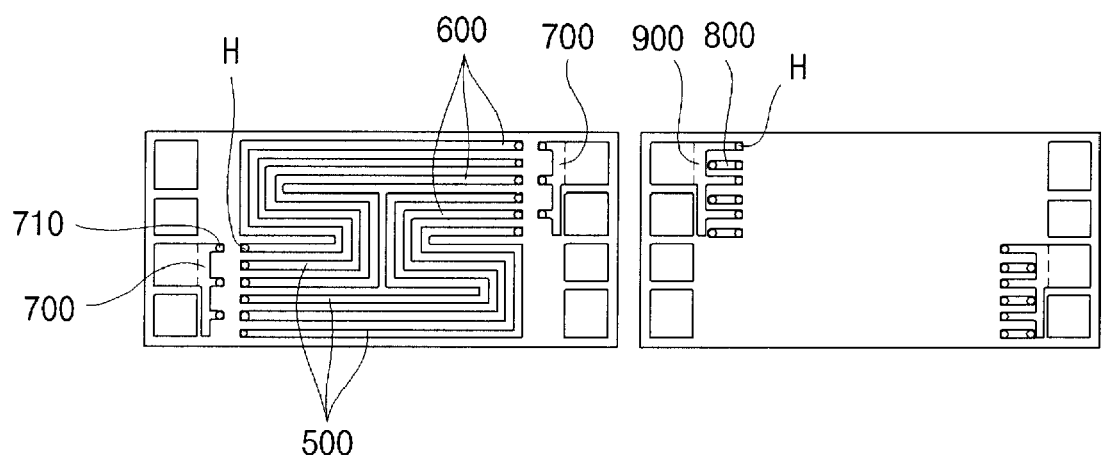
FIG. 7 are plan views showing an upper surface and a lower surface of a separator of FIG. 5.

A separator for a fuel cell having channels for self-humidification according to a second exemplary embodiment of the present invention will be explained hereinafter (explanations for the same parts with the first exemplary embodiment will be omitted for ease of description). As shown in FIG. 5 and FIG. 7, manifolds 400 are formed on both ends of a separator S2 along a length direction thereof according to a second exemplary embodiment of the present invention, and a plurality of channels 500 and 600 and connecting channels 700 which connect a portion of the channels 500 and 600 and the manifold 400 are formed on an upper surface of the separator S2. Auxiliary channels 800 which connects the remained channels 500 and 600 and the manifold 400 are formed on a lower surface of the separator S2.

The manifolds 400 are perforated at both end parts of the separator S2 in a length direction thereof. An anode intake manifold 412, a coolant intake manifold 414, a cathode exhaust manifold 418, and a cathode intake manifold 416 are sequentially formed at one end of the separator S2, and a cathode intake manifold 428, a cathode exhaust manifold 426, a coolant exhaust manifold 424, and an anode exhaust manifold 422 are sequentially formed at the other end of the separator S2.

The plurality of the first channels 500 and the second channels 600 are respectively supplied with fuel from the different cathode intake manifolds 416 and 428, and respectively exhaust fuel through the different cathode exhaust manifolds 418 and 426, and are arranged in a zigzag shape such that directions of fuel flow in the neighboring channels 500 and 600 become opposite to one another (since channels are formed in a similar way to the first exemplary embodiment, detailed explanations will be omitted).

The connecting channel 700 are connected to the cathode intake manifold 416 which is formed at one end of the separator S2 and the cathode exhaust manifold 426 which is formed at the other end of the separator S2. A through hole 710 is formed in the connecting channel 700 so as to be connected to the auxiliary channel 800 which is formed at a lower surface of the separator S2, and is connected to the first channel 500 through the auxiliary channel 800. For this, holes H are formed at end portions of the auxiliary channel 800 and the first channel 500.

An auxiliary passage 900 is formed on a lower surface of the separator S2 so as to connect the remained cathode intake manifold 428 and the cathode exhaust manifold 418 of the separator S2 to the second channel 600. For this, holes H are formed at end portions of the auxiliary passage 900 and the second channel 600.

By this configuration, the first channel 500 and the second channel 600 have different directions of fuel flow. In addition, the exhaust manifolds 418 and 426 through which fuel containing much humidity are dispersed on both sides of the separator S2, and humidity moves along a gas diffusion layer from the side in which more humidity is contained to the side in which smaller humidity is contained, so that a membrane-electrode assembly can be humidified without a separate humidifying apparatus.

Although explanations have been made as an example of the separator having a plurality of cathode intake manifolds and cathode exhaust manifolds, explanations can also be similarly applied to an anode intake manifold and an anode exhaust manifold.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, a separator for a fuel cell having channels for self-humidification according to exemplary embodiments of the present invention can humidify fuel with water generated within a fuel cell, so that a separate humidifying apparatus can be eliminated or a size thereof can be substantially reduced.

Furthermore, since fuel is humidified by moistures generated within a fuel cell, the flooding phenomenon that channels are blocked by condensed water at end portions of a cathode channel and an anode channel can be prevented, so that performance and durability of a fuel cell stack can be enhanced.

What is claimed is:

1. A separator mounted to one side surface of a membrane-electrode assembly for a fuel cell, the separator having channels for self-humidification, comprising:
   a main separator and a sub separator coupled directly to a lower surface of the main separator away from the membrane-electrode assembly;
   a plurality of intake manifolds and exhaust manifolds perforated on both end portions of the main separator and the sub separator and through which fuel inflows and is exhausted;
   a plurality of channels formed on an upper surface of the main separator so that fuel is supplied through different intake manifolds and is exhausted through different exhaust manifolds such that directions of fuel flow become opposite to one another;
   auxiliary channels formed on an upper surface and a lower surface of the sub separator so as to connect the intake manifolds and the exhaust manifolds to the channels; and
   a connecting channel which is formed on the lower surface of the main separator at positions corresponding to the auxiliary channels so as to be communicated with the channels, and connecting the channels and the auxiliary channels such that the channels and the auxiliary channels communicate with one another.

2. The separator of claim 1, wherein the channels are formed in a zigzag shape while the channels do not overlap with one another and are formed subsided shape on an upper surface of the main separator such that directions of fuel flows in the neighboring channels are opposite to one another.

3. The separator of claim 1, wherein said separator is coupled to a membrane-electrode assembly so as to become passages of fuel and coolant and to support the membrane-electrode assembly.

4. A separator mounted to one side surface of a membrane-electrode assembly for a fuel cell, the separator having channels for self-humidification, comprising:
   a plurality of intake manifolds and exhaust manifolds perforated on both end portions and through which fuel inflows and is exhausted;
   a plurality of channels formed on an upper surface adjacent to said one side surface of the membrane assembly so that fuel is supplied through different intake manifolds and is exhausted through different exhaust manifolds such that directions of fuel flow become opposite to one another;
   a connecting channel which is formed on the upper surface adjacent to said one side surface of the membrane assembly so as to connect a pair of the intake manifold and the exhaust manifold among the plurality of the intake manifolds and the exhaust manifolds and the channels; and
   an auxiliary channel which is formed on a lower surface further away from said one side surface of the membrane assembly than said upper surface so as to connect another pair of the intake manifold and the exhaust manifold among the plurality of the intake manifolds and the exhaust manifolds and the channels.

5. The separator of claim 4, further comprising an auxiliary passage which is formed on the lower surface so as to communicate the connecting channel with the channels.

6. The separator of claim 4, wherein the channels are formed in a zigzag shape while the channels do not overlap with one another and are formed subsided shape on the upper surface such that directions of fuel flows in the neighboring channels are opposite to one another.

7. The separator of claim 4, wherein said separator is coupled to a membrane-electrode assembly so as to become passages of fuel and coolant and to support the membrane-electrode assembly.

* * * * *